United States Patent

Konzmann et al.

Patent Number: 5,416,136
Date of Patent: May 16, 1995

[54] CATALYST-FREE SINGLE-COMPONENT COATING AGENT AND USE THEREOF FOR PRODUCING ACID-RESISTANT LACQUER COATINGS

[75] Inventors: Heinz Konzmann; Friedrich Herrmann; Wolfgang Diener, all of Wuppertal, Germany

[73] Assignee: Herberts GmbH, Wuppertal, Germany

[21] Appl. No.: 236,864

[22] Filed: Apr. 29, 1994

Related U.S. Application Data

[63] Continuation of Ser. No. 960,490, Oct. 9, 1992, abandoned.

[30] Foreign Application Priority Data

Oct. 11, 1991 [DE] Germany .......................... 41 33 704.2

[51] Int. Cl.⁶ .............................................. C08L 63/02
[52] U.S. Cl. ................................... 523/414; 525/301; 525/302; 525/426; 525/530
[58] Field of Search ................. 523/414, 415; 525/530, 525/531, 301, 302, 426

[56] References Cited

U.S. PATENT DOCUMENTS 5,159,024  10/1992  Brindopke et al. ................. 525/426
5,169,979  12/1992  Kubillus et al. ..................... 560/176

OTHER PUBLICATIONS

March, "Advanced Org. Chem.", 1977, p. 1005.

*Primary Examiner*—Melvyn I. Marquis
*Assistant Examiner*—D. Aylward
*Attorney, Agent, or Firm*—Richard A. Speer; Keck, Mahin & Cate

[57] ABSTRACT

A catalyst-free single-component coating agent containing (A) one or more compounds acting as cross-linking agents and with on average at least two CH-azide hydrogen atoms, (B) one or more (meth)acrylate copolymers, polyester resins and/or polyurethane resins capable of Michael addition, with $\alpha$, $\beta$-unsaturated groups bonded via carbonyl, carboxyl and/or carboxylic amide groups, a C=C equivalent weight of 85–1800 and a weight average molecular weight of 170–50000. The equivalent ratio of A to B is 2:1 to 1:2. The coating agent contains solvents and conventional lacquer additives, and optionally contains water, pigments and/or fillers. It results in particularly acid-resistant coatings and is particularly suitable for producing covering lacquer and clear lacquer coatings in the motor-vehicle sector.

4 Claims, No Drawings

CATALYST-FREE SINGLE-COMPONENT COATING AGENT AND USE THEREOF FOR PRODUCING ACID-RESISTANT LACQUER COATINGS

This is a continuation of application Ser. No. 07/960,490 filed on Oct. 9, 1992, the text of which is hereby incorporated by reference and now abandoned.

FIELD OF THE INVENTION

The invention relates to a coating agent suitable for producing particularly acid-resistant clear lacquer and covering lacquer coatings, more particularly in the manufacture of multi-layer lacquer coatings in the motor vehicle sector.

BACKGROUND OF THE INVENTION

In the motor vehicle industry, the requirements made on car lacquering are altering in response to changed quality requirements. Requirements such as high gloss and mechanical stability, e.g. against gravel, have long been made. Other requirements were made later, with regard to resistance of the lacquered surfaces to petrol and oil. Environmental changes, however, result in additional stresses. One important aspect is "acid rain". The lacquer industry is therefore required to produce acid-resistant coatings on articles subjected to normal weathering. Other corrosive conditions can occur if animal excrement falls on the lacquer and remains there for a time.

Earlier test methods frequently used only dilute acetic acid to test the stability of the lacquer, but new test methods require much more severe conditions. For example, up to 40% sulphuric acid is used in tests, sometimes at elevated temperatures of up to 70° C. The lacquer must show practically no change in protective properties and appearance at the places tested. At most, the surface can be slightly roughened by the acid attack.

Another aspect of concern to the lacquer industry is the handling of physiologically dangerous substances, e.g. carcinogens or mutagens. Isocyanates or aromatic solvents are examples of compounds which may be hazardous.

When lacquer binding agents based on lacquer systems cross-linked via free isocyanate groups are used, volatile reactive isocyanate may enter the gas phase during application and thus endanger the persons at work. Isocyanate-containing coating agents should also as far as possible be kept from contact with the skin.

For this reason, there has already been research on avoiding the use of reactive isocyanates in coating agents for the car industry. EP-A-34 720 describes oxazolidine-containing acrylate resins which cross-link with water or atmospheric humidity to form films. However, the system has the disadvantage that the hardening surface prevents water from penetrating more deeply into the lower layers of lacquer so that they can harden fully. Other binder systems, known e.g. from EP-A-50 249, comprise silicon-containing polymers which react with moisture and can cross-link via hydrolysis-sensitive groups on the Si atom. These systems have the disadvantage that cross-linking depends on the relative air humidity. On the other hand, during storage care must be taken that no moisture reaches the coating agent, since otherwise normal processing may be impossible.

U.S. Pat. No. 4,408,018 describes acrylic polymers into which acetoacetate groupings have been introduced. These are designed to cross-link with $\alpha,\beta$-unsaturated esters. The catalysts for this cross-linking reaction have to be strong bases. These remain in the coating film after hardening and adversely affect the properties of the coating, e.g. yellowing or turbidity of the clear lacquer film.

DE-OS 35 41 140, EP-A-160 824 and EP-A-310 011 describe hardening components and binder systems for the lacquer industry. The substances are solvent-containing two-component systems (2K systems) produced on the basis of a polyunsaturated acrylate resin and a CH-, NH- or SH-active hardening component. Catalytically active compounds in the lacquer system are necessary in order to obtain rapid and adequate cross-linking. The following examples of catalysts are mentioned: tertiary amines, amidines, guanidines, phosphanes and halides of quaternary ammonium compounds. The quantity of catalysts can be up to 5% by weight. They are needed for accelerating the hardening reaction, which may optionally be assisted by elevated temperatures.

The previously-mentioned coating-agents must be used in the form of two-component systems. They contain catalytically active compounds and therefore cannot be formulated as single-component systems (1K systems). Catalyst-containing 2K systems mixed before application have a pot life not exceeding 48 hours, after which the coating agent is no longer usable. If these known coating agents are used as clear lacquers or covering lacquers, they have reduced resistance to yellowing when exposed to light. In addition, the known coating agents do not meet the previously-mentioned more exacting criteria as regards corrosion by acid.

SUMMARY OF THE INVENTION

The aim of the invention, therefore, is to provide a coating agent which is free from reactive isocyanate, has a longer shelf life, and gives a coating which does not turn yellow and which meets more severe requirements regarding resistance to acids and is therefore particularly suitable for use as a clear lacquer or covering lacquer.

It has been shown that this problem can be solved by a catalyst-free single-component coating agent which contains A) one or more compounds serving as cross-linking agents and with on average at least two CH-azide hydrogen atoms, B) one or more (meth)acrylate copolymers, polyester resins and/or polyurethane resins suitable for Michael addition, comprising $\alpha,\beta$-unsaturated groups bonded via the carbonyl carbon atom of carbonyl, ester and/or amide groups, with a C=C equivalent weight of 85–1800 and a weight average molecular weight (Mw) of 170–50000. In the coating agent, the equivalent ratio of component A) to component B) is 2:1 to 1:2. The coating agent, which is a subject of the invention, contains a solvent and/or water. It can contain conventional lacquer additives. Optionally it also contains one or more pigments.

It has been found that a coating agent of this kind has good storage properties. It is applied without a catalyst and can be cross-linked or hardened after application by heating to temperatures of 100°–180° C, more particularly 110°–180° C. The resulting coatings pass the initially-mentioned severe acid test, i.e. treatment with up to 40% sulphuric acid at elevated temperatures up to 70° C. The resulting coatings are free from yellowing and have good hardness.

It is surprising that the coating agent according to the invention can harden without catalysts, since it is taken for granted by the skilled man that Michael addition processes occur only in the presence of basic catalysts (see e.g. "Oranicum", VEB DEUTSCHER VERLAG DER WISSENSCHAFTEN; BERLIN 1977, page 632).

DETAILED DESCRIPTION OF THE PREFERRED EMBODIMENTS

In the coating-agents according to the invention, the CH-azide cross-linking agents used as component A) preferably contain at least two CH-azide hydrogen atoms originating from one or more of the following groupings, which can be the same or different:

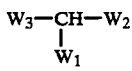

where
$W_1$ is selected from

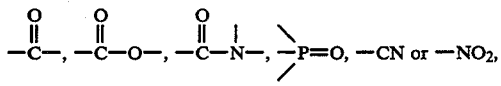

$W_2$ is selected from

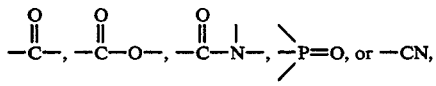

and
$W_3$ is selected from

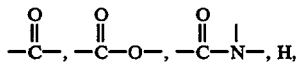

alkyl or alkylene, and
the carboxyl or carboxylic amide groups previously defined for the radicals $W_1$, $W_2$ and $W_3$ are each bonded to the CH group via the carbon atom and the CH group is bonded via at least one of the radicals $W_1$, $W_2$ and/or $W_3$ to a polymeric or oligomeric unit. The CH-azide functionality of component A) is on average at least 2 per molecule. If therefore $W_3$ in the preceding general formula denotes a hydrogen atom, one such group is sufficient, since it comprises two azide hydrogen atoms.

As previously mentioned, the CH-azide functionality of component A) on average is at least 2. This means that monofunctional molecules can be used mixed with higher-functional molecules. Preferably the CH-azide cross-linking compounds are substantially free from primary, secondary or tertiary amino groups, since these adversely influence the shelf life and the resistance to light.

The following are some examples of CH-azide cross-linking components A which come under the preceding general formula.

These examples will hereinafter be divided into three groups A1, A2 and A3.

In group A1, the molecule on average contains at least two groups with active H atoms, such as

derived from methane tricarboxylic acid monoamide units.

The compounds A1 may e.g. be reaction products of polyisocyanates with malonic acid diesters such as malonic acid dimethyl or diethyl or dibutyl or dipentyl ester.

The following are examples of the aforementioned isocyanates of use according to the invention:

(Cyclo)aliphatic or aromatic polyisocyanates such as tetramethylene diisocyanate, hexamethylene diisocyanate, 2,2,4-trimethyl hexamethylene diisocyanate, 1,12-dodecane diisocyanate, cyclohexane 1,3- and 1,4-diisocyanate, 1-isocyanato-3,3,5-trimethyl-5-isocyanato-methyl cyclohexane (=isophorone diisocyanate, IPDI), perhydro-2,4'- and/or -4,4'-diphenyl methane diisocyanate, 1,3- and 1,4-phenylene diisocyanate, 2,4- and 2,6-toluylene diisocyanate, diphenylmethane 2,4' and/or -4,4'-diisocyanate, 3,2'- and/or 3,4-diisocyanato-4-methyl-dimethylmethane, naphthylene-1,5-diisocyanate, triphenyl methane-4,4'-4''-triisocyanate or mixtures of these compounds.

In addition to these simple isocyanates, use can also be made of substances containing heteroatoms in the radical linking the isocyanate groups. The following are examples: polyisocyanates containing carbodiimide groups, allophanate groups, isocyanurate groups, urethane groups, acylated urea groups or biuret groups.

The known polyisocyanates chiefly used in the production of lacquers are particularly suitable for the method according to the invention, e.g. modification products of the aforementioned simple polyisocyanates comprising biuret, isocyanurate or urethane groups, more particularly tris-(6-isocyanatohexyl)-biuret or lower-molecular urethane group-containing polyisocyanates obtainable by reacting an excess of IPDI with simple polyhydric alcohols in the molecular weight range from 62 to 300, more particularly with trimethylol propane. Of course any mixtures of the aforementioned polyisocyanates may also be used to obtain the products according to the invention.

The polyisocyanates may also be the known prepolymers comprising terminal isocyanate groups, as obtained more particularly by reacting the aforementioned simple polyisocyanates, particularly diisocyanates, with insufficient quantities of organic compounds containing at least two groups capable of reacting with isocyanate groups. Preferably these compounds have a total of at least two amino groups and/or hydroxyl groups and a number average molecular weight of 300 to 10000, preferably 400 to 6000. It is preferable to use the corresponding polyhydroxyl compounds, e.g. hydroxypolyesters, hydroxypolyethers and/or hydroxyl group-containing acrylate resins known per se in polyurethane chemistry.

In these known prepolymers the ratio of isocyanate groups to hydrogen atoms reacting with NCO is 1.05 to 10:1, preferably 1.1 to 3:1, the hydrogen atoms preferably originating from hydroxyl groups.

The nature and proportions of the starting materials for producing the NCO prepolymers are preferably chosen so that the NCO prepolymers have a) an average NCO functionality of 2 to 4, preferably 2 to 3 and b) a number average molecular weight of 500–10000, preferably 800–4000.

Alternatively the compounds A1 can be products of a reaction between monoisocyanates and esters or partial esters of poly-hydric alcohols of malonic acid. The polyhydric alcohols can e.g. be divalent to pentavalent alcohols such as ethanediol, the various propane, butane, pentane and hexane diols, polyethylene and propylene diols, glycerol, trimethylol ethane and propane, pentaerythritol, hexanetriol and sorbitol. The monoisocyanates can e.g. be aliphatic isocyanates such as n-butyl isocyanate, octadecyl isocyanate, cycloaliphatic isocyanates such as cyclohexyl isocyanate, araliphatic isocyanates such as benzyl isocyanate or aromatic isocyanates such as phenyl isocyanate.

Use may also be made of the corresponding malonic esters of OH group-containing acrylic resins, polyesters, polyurethanes, polyethers, polyester amides and imides and/or reaction products of malonic acid semiesters, e.g. malonic acid mono-ethyl ester, with aliphatic and aromatic epoxy resins, e.g. epoxy group-containing acrylate resins, glycidyl ethers of polyols such as hexanediol, neopentyl glycol, diphenylol propane and diphenylol methane, hydantoins containing glycidyl groups, or mixtures of these compounds.

The examples in the following group A2 comprise a suitable hardening component with active CH groups, containing at least two groups having the formula (I):

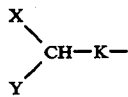
(I)

or structural units having the formula (I') or (I''):

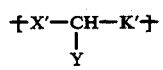
(I')

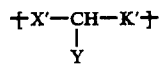
(I'')

in which

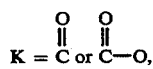

the last-mentioned group being bonded to the CH group via the C atom;

X and Y, which are the same or different, are

$CO_2R^1$, CN, $NO_2$, $CONH_2$, $CONR^1H$ or $CONR^1R^1$, where the radicals $R^1$ can be the same or different and stand for a hydrocarbon radical, preferably an alkyl radical with 1 to 12, preferably 1 to 6 carbon atoms, which can also be interrupted by oxygen or an N-alkyl radical, with the proviso that only one of the two radicals X, Y can denote the $NO_2$ group;

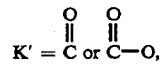

the last-mentioned group being bonded to the CH group via the C atom,

X', Y', which are the same or different, denote:

subject to the proviso that when K' and X' denote:

the radical Y' preferably does not denote:

The number of groups (I) in the activator according to the invention is preferably 2 to 200, more particularly 2 to 10, the larger numbers referring to oligomeric or polymeric products and representing average values in this case.

Preferably the activator component A2 used according to the invention has the formula (II):

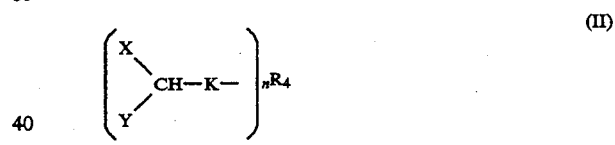
(II)

in which X, Y and K have the previously given meaning, $R^2$ denotes the radical of a polyol:

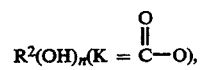

the radical $R^2$ of a polycarboxylic acid:

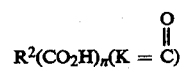

and n is at least 2, preferably 2 to 200, more particularly 2 to 10. In the case of oligomeric or polymeric activator components, the aforementioned numbers are again average values.

Other preferred activator components in group A2 are obtained by transesterification of formula (III) or formula (IV) compounds:

(III)

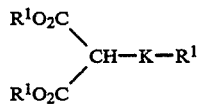

$$\begin{array}{c} R^1O_2C \\ \phantom{R^1O_2C}\diagdown \\ \phantom{R^1O_2C}CH-K-R^1 \\ \phantom{R^1O_2C}\diagup \\ R^1O_2C \end{array} \quad (IV)$$

with polyols $R^2(OH)_n$, where X, K and $R^1$ have the meanings as previously.

The previously-mentioned polyols $R_2(OH)_n$ can be polyhydric alcohols containing preferably 2 to 12, more particularly 2 to 6 carbon atoms. The following are examples: ethylene glycol, propylene glycol-(1,2) and -(1,3), butylene glycol-(1,4) and -(2,3), di-$\beta$-hydroxyethyl butanediol, hexanediol-(1,6), octanediol-(1,8), neopentyl glycol, cyclohexanediol-(1,6), 1,4-bis-(hydroxymethyl)-cyclohexane, 2,2-bis-(4-hydroxycyclohexyl)-propane, 2,2-bis-(4-($\beta$-hydroxyethoxy)-phenyl)-propane, 2-methyl-1,3-propanediol, glycerol, trimethylol propane, hexanetriol-(1,2,6), butanetriol-(1,2,4), tris-($\beta$-hydroxyethyl)-isocyanurate, trimethylol ethane, pentaerythritol and hydroxyalkylation products thereof, or diethylene glycol, triethylene glycol, tetraethylene glycol, polyethylene glycols, dipropylene glycol, tripropylene glycol, polypropylene glycols, dibutylene glycol, polybutylene glycols or xylylene glycol. Use can also be made of polyesters obtained from or with lactones, e.g. $\epsilon$-caprolactone or hydroxycarboxylic acids such as hydroxypivalic acid, $\omega$-hydroxydecanoic acid, $\omega$-hydroxy caproic acid or thioglycolic acid. In the case of these polyhydric alcohols, the subscript n in formula (II) preferably stands for 2 to 4.

Alternatively the polyol can be an oligonumeric or polymeric polyol compound (polyol resin), having a molecular weight $\overline{M}w$ (weight average, determined by gel chromatography; polystyrene standard) usually in the range from about 300 to about 50000, preferably about 5000 to about 20000. In special cases however the molecular weight can be 100000 or more. The oligomers or polymers can be polymers, polycondensates or polyaddition compounds. The hydroxyl number is generally 30 to 250, preferably 45 to 200, more particularly 50 to 180 mg KOH/g. These OH group-containing compounds can optionally contain other functional groups, such as carboxyl groups.

The following are examples of these polyols: polyether polyols, polyacetal polyols, polyester amide polyols, polyamide polyols, epoxy resin polyols or reaction products thereof with $CO_2$, phenolic resin polyols, polyurea polyols, polyurethane polyols, cellulose esters and ether polyols, partly saponified homo- and copolymers of vinyl esters, partly acetalised polyvinyl alcohols, polycarbonate polyols, polyester polyols or acrylate resin polyols. Polyether polyols, polyester polyols, acrylate resins and polyurethane polyols are preferred. These polyols, which can also be used in mixtures, are described e.g. in DE-OS 31 24 784.

Examples of polyurethane polyols are obtained by reacting di- and polyisocyanates with an excess of di- and/or polyols. The following are examples of suitable isocyanates: hexamethylene diisocyanate, isophorone diisocyanate, toluylene diisocyanate or isocyanates formed from 3 mols of a diisocyanate such as hexamethylene diisocyanate or isophorone diisocyanate and biurets obtained by reacting 3 mols of a diisocyanate with 1 mol of water. Suitable polyurea polyols can be obtained in similar manner by reacting di- and polyisocyanates with equimolar quantities of amino alcohols, e.g. ethanolamine or diethanolamine.

The polyester polyols can be the known polycondensates from di- or polycarboxylic acids or anhydrides thereof, such as phthalic acid anhydride, adipic acid etc., or polyols such as ethylene glycol, trimethylol propane, glycerol, etc.

Conventional polyamide polyols can be obtained in similar manner to polyesters, by replacing the polyols at least partly by polyamines such as isophorone diamine, hexamethylene diamine or diethylene triamine.

The polyacrylate polyols or OH group-containing polyvinyl compounds can be known copolymers of hydroxyl group-containing (meth)acrylic acid esters or vinyl alcohol and other vinyl compounds such as styrene or (meth)acrylic acid esters.

The aforementioned polycarboxylic acids $R_2(CO_2H)_n$, where n is preferably 2 to 4, can be aliphatic, cycloaliphatic, aromatic and/or heterocyclic and optionally substituted and/or saturated, e.g. by halogen atoms. The following are examples of these carboxylic acids and their derivatives: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, di- and tetrachlorophthalic acid, endomethylene tetrahydrophthalic acid and its hexachloro derivative, glutaric acid, maleic acid, fumaric acid, dimeric and trimeric fatty acids such as oleic acid optionally mixed with monomeric fatty acids or cyclic monocarboxylic acids such as benzoic acid, p-tert-butyl benzoic acid or hexahydrobenzoic acid. Also the reaction products of the aforementioned polyols $R_2(OH)_n$ with cyclic carboxylic acid anhydrides.

The activator component A2 used according to the invention, depending on the nature of the polyol or polycarboxylic acid component, can be a relatively viscous liquid or a solid which is substantially soluble at least in conventional lacquer solvents and preferably contains less than 5 wt. % more particularly less than 1 wt. % of cross-linked components. The CH equivalent weight, which measures the proportion of groups (I) or structural units (I')/(II'') in (A2), is usually between 100 and 5000, preferably 200 and 2000, and the average molecular weight Mw is usually between 1000 and 100000, preferably between 2000 and 50000 (determined by gel chromatography; polystyrene standard). Methods of preparing these compounds are described in detail in EP-A-0 310 011.

Other examples of the activator component used according to the invention are type A3 substances in which the grouping CH is derived from a compound containing the grouping $-CO-CHR^3-CO-$, $NC-CHR^3-CO-$, $NC-CH_2-CN$, $=PO-CHR^3-CO-$, $=PO-CHR^3-CN$, $=PO-CHR^3-PO=$ or $-CO-CHR^3-NO_2$, where $R^3$ denotes $C_1-C_8$ alkyl or H, preferably hydrogen. $\beta$-dioxo compounds are preferred.

The aforementioned groupings of A3 can be bonded to at least one polyvalent monomeric or polymeric compound. They can be bonded e.g. to at least one compound in the group made up of mono- or polyhydric alcohols, OH group-containing polymers, polyamines and polymercaptans. They are polyvalent with regard to the CH group. For example they can be prepared by esterifying a polyepoxide with a —CH-carboxylic acid forming the grouping, e.g. cyanoacetic acid. The result is a component A3 with two active H atoms per epoxy group. Aromatic or aliphatic polyepoxides can be used in this way.

The type A3 compounds can be ketones such as acetyl acetone, benzoyl acetone, acetyl dibenzoyl methane, or esters of optionally alkyl-substituted acetoacetic acid such as α- and/or γ-methyl acetoacetic acid, or of acetone dicarboxylic acid, or ester-like bonded malonic acid units of malonic acid and monoalkyl derivatives thereof, straight-chain or branched, with 1 to 6 carbon atoms in the alkyl radical, e.g. methyl, ethyl and n-butyl or phenyl, or of cyanoacetic acid with mono- to hexahydric alcohols with 1 to 10 carbon atoms. The alkyl-substituted esters, e.g. α-methyl or α-γ-dimethyl aceto-acetic esters, have only one active H atom and are therefore preferably used in the form of di- or polyesters of polyhydric alcohols, to obtain a sufficient number of available reactive groups. The alcohols for esterifying the aforementioned acids can e.g. be methanol, ethanol, butanol, octanol and/or preferably polyhydric alcohols or polyhydroxy compounds. The following are other examples of A3: acetoacetic acid, ethanediol-bis-acetoacetic ester, glycerol tris-malonic acid ester, trimethylol propane-tris-acetoacetic ester, partial esters of these acids with polyhydric alcohols, or the corresponding esters of OH group-containing acrylic resins, polyesters, polyethers, polyester amides and imides, polyhydroxyl amines or nitriles of these acids if they exist, e.g. malonic acid mono- or dinitrile, alkoxy carbonyl methane phosphonic acid esters and the corresponding bismethane phosphonic acid ester. The previously-mentioned acids can also be bonded in the form of amides to amines, preferably polyamines, which also contain oligomers and/or polymers including amine resins, preferably aliphatic amines.

If polyamines are the starting material, compounds A3 can be prepared in the form of amides. For example the starting material can be 1 mol of an alkylene diamine, which is reacted with 2 mol of acetoacetic ester to form a compound which likewise has 4 H atoms activated by amide groups.

The compounds for A3 can also be reactive nitro compounds., e.g. nitroacetic acid derivatives such as tris-(nitroacetic acid)-glycerol ester or trimethylol propane' nitroacetic acid ester.

Compound for A3 containing —CH— type groups can e.g. be diketene or its mono-α-alkyl substitution products, or tetrahydro dioxin, these substances being capable of reacting with suitable components to form acetoacetic ester or amide groups.

The activator components A can be produced in conventional solvents. It is advantageous to use solvents which do not cause trouble later when the coating agent is manufactured. Advantageously also the content of organic solvents is kept at a minimum. If the activator component A contains polar groups such as amide or urethane groupings, slight dispersion in water is possible. This can optionally also be assisted if the cross-linking components contain neutralisable ionic groups, e.g. carboxyl groups, in the oligomer or polymer skeleton. These cross-linking agents with ionic groups can easily be dispersed in water. In the process the content of organic solvents can be reduced to low values without substantially increasing the viscosity of the cross-linking solution.

The binders (B) capable of Michael addition are compounds containing at least two groups capable of Michael addition, i.e. groups (Michael acceptors) containing double bonds activated by at least one negativising group. The α-β-unsaturated groups in component B can be incorporated in the chains of the copolymers or resins. They can preferably also be at the side and/or in a terminal position. Suitable compounds (B) are described e.g. in DE-PS 835 809, U.S. Pat. No. 4,408,018 or EP-OS 16 16 79 or 22 41 58, to which reference may be made. These compounds (B) contain at least two groups having the formula:

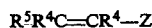

$$R^5R^4C=CR^4-Z \qquad (v)$$

in which $R^5$=hydrogen or a hydrocarbon radical, preferably an alkyl radical with 1 to 12, preferably 1 to 4 C atoms, such as the methyl, ethyl, n-propyl, iso-propyl, n-butyl or tert.butyl group;

$R^4$ can be the same or different and denotes hydrogen, a hydrocarbon radical, preferably an alkyl radical with 1 to 10, preferably 1 to 4 C atoms, or an ester group $-CO_2R^1$, or a $-CN$, $-NO_2$, $-SO_2-$, $-CONHR^1$, $-CONR^1R^1$ or $-COR^1$ group, where $R^1$ can be the same or different, the substances being as defined in formula I hereinbefore;

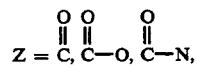

$$Z = \overset{O}{\underset{\|}{C}},\ \overset{O}{\underset{\|}{C}}-O,\ \overset{O}{\underset{\|}{C}}-N,$$

the last two groups being bonded to the $CR^4$ group via the C atom.

Preferably $R^5$ and $R^4$ in the aforementioned $R^5R_4C=C$ group each stand for hydrogen.

The aforementioned groups V are indirectly interconnected. The indirect link can e.g. be a hydrocarbon radical, but is preferably the radical of a polyhydric alcohol or a polyhydric amine or amino alcohol. The indirect link can also be a part of the chain of an oligomer and/or polymer, i.e. the group V can be in or can constitute the side chains of the oligomer or polymer.

In one special embodiment, the compound (B) has the formula:

$$(R^5R^4C=CR^4-Z)_mR^2 \qquad (VI)$$

in which $R^5$, $R^4$ and Z have the same meanings as in formula. (V), $R^2$ has the meaning in formula (II), and m denotes at least 2, preferably 2 to 200.

The group $R^5R^4C=CR^4-Z-$(V) can e.g. be derived from a mono- or polyunsaturated mono or dicarboxylic acid with 2 to 20, preferably 3 to 10 carbon atoms.

The following are examples of these carboxylic acids: crotonic acid, citraconic acid or the anhydride thereof, sorbic acid, fumaric acid, mesaconic acid, substituted or unsubstituted cinnamic acids, dihydrolaevulinic acid, malonic acid mononitrile, α-cyanacrylic acid, alkylidene malonic acid, alkylidene acetoacetic acid, preferably acrylic acid, methacrylic acid and/or maleic acid or the anhydride thereof. The link between the Michael acceptor and the connecting component via the group Z, or alternatively via the radical $R^4$ as in a polymeric carrier, can be via ester, amide, urethane or urea groups.

In accordance with the preceding, the groups in formula (V) can be bonded to the radical of a polyol, a polyamine, polyamide or a polyimino amide, the radical likewise being oligomeric or polymeric.

The polyols here are basically the same as mentioned in other places or in connection with the Michael donor, i.e. polyhydric alcohols or oligomeric or polymeric polyol compounds, e.g. polyether polyols, polyester polyols, acrylate resin polyols or polyurethane polyols.

The carriers containing amino groups (polyamines) can e.g. be the aforementioned alkylene diamines and their oligomers, such as ethylene diamine, propylene diamine, butylene diamine, diethylene triamine, tetramines or higher homologues of these amines, or amino alcohols such as diethanolamine or the like.

The following are examples of compounds (B): alkyl glycol di(meth)acrylates such as ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10-decamethylene glycol diacrylate, trimethylol propane diacrylate, pentaerythritol tetraacrylate, pentaerythritol triacrylate and the corresponding methacrylates.

In addition, the $\alpha,\beta$-unsaturated group bonded via a carbony hydrocarbon atom can be bonded to polymers, e.g. condensation polymers such as polyesters or polyaddition polymers such as polyurethanes, polyethers or (meth)acrylic copolymers or vinyl polymers such as glycidyl (meth)acrylate copolymers. The following are examples: urethane acrylates obtained by reacting polyisocyanates, e.g. hexamethylene diisocyanate, with hydroxyalkyl acrylates such as hydroxyethyl acrylate, or by reaction of hydroxyl group-containing polyesters, polyethers or polyacrylates with polyisocyanates and hydroxyalkyl acrylates; urethane acrylates obtained by reaction of caprolactone diol or triol with polyisocyanates and hydroxyalkyl acrylates, polyether acrylates obtained by esterification of hydroxypolyethers with acrylic acid, polyester acrylates, obtained by esterification of hydroxypolyesters with acrylic acid, or polyacrylates obtained by reacting acrylic acid with vinyl polymers containing epoxy groups, e.g. copolymers of glycidyl (meth)acrylate or vinyl glycidyl ether. Here and hereinafter, "(meth)acrylic" means acrylic and/or methacrylic.

The component (B) can also be a mixture of the aforementioned compounds. The C=C equivalent weight of component (B) is preferably about 85 to 1800, preferably 180 to 1200, and the weight average molecular weight ($\overline{Mw}$) is e.g. about 170 to 50000, preferably 500 to 30000. Preferably the component (B) has an OH number below 350, particularly preferably between 30 and 200.

Preferably the component (B) and also preferably the component (A) are substantially free from primary, secondary and tertiary amino groups.

The coating agent according to the invention comprises a mixture of the CH-azide cross-linking component A and the binder B. Mixtures of different components A or B can also be used. The binders are compatible with one another and, for ease of mixing, are mixed with solvents, preferably solvents which do not adversely affect the lacquer later on.

The proportions of the two components (A) and (B) depend on the number of available CH-azide hydrocarbon atoms in the cross-linking component and the number of unsaturated groups in the $\alpha,\beta$-unsaturated compound. Since the reactive groups can be determined titrimetrically, exactly adjusted stoichiometric mixture proportions can be obtained. Preferably the equivalent ratio of CH-azide to $\alpha,\beta$-unsaturated groups is 2:1 to 1:2, especially about 0.75:1 to 1.25:1. This usually results in an adequate density of cross-linking.

The elasticity of the cross-linked product can be controlled within a tolerance range, e.g. via the chain length of the oligomers and/or polymers used for (A) and (B). The oligomers and/or polymers can therefore be chosen in dependence on the desired elasticity of the cross-linked product. The degree of cross-linking can be controlled via the functionality of the compounds (A) and (B) used. For example, the degree of cross-linking can be increased if at least one of the compounds (A) and (B) contains three or more reactive groups.

According to the invention, the cross-linking component A and the binder component B or the mixtures thereof can be used in solvent-containing form. Alternatively, aqueous coating agents can be produced. To this end the cross-linking component A and the binder component B, optionally with small proportions of solvent and optionally together with emulsifiers, can be converted to the aqueous phase. The solvents are preferably miscible with water. The amount of solvent can be e g up to 15 wt. % preferably up to 10 wt. % relative to the finished aqueous composition. The emulsifiers can be ionic or non-ionic, preferably non-ionic. The content of emulsifier can be e g about 0 5 to 30 wt. %, preferably between 1.5 and 15 wt. %, relative to the content of solids of component (A) and component (B) in the finished aqueous coating agent.

The aqueous dispersions can be prepared by conventional methods known to the skilled man. For example the solvent-containing forms of components A and B or mixtures thereof can be substantially freed from solvents, preferably by distillation under reduced pressure, the emulsifier preferably being dispersed in the resins or resin mixtures while still warm and thinly viscous, after which the mixture can be added to the water phase, e.g. with vigorous agitation. Manufacture of the dispersion can be assisted by heating the aqueous phase. The mixers can e.g. be high-speed agitators or rotor-stator mixers. Alternatively the dispersion process can be improved by high-pressure or ultrasonic homogenisers.

The process can be continuous or discontinuous. The resulting dispersions can be mixed with one another at this time also. The result is an aqueous oil-in-water dispersion which is stable in storage and can without difficulty be adjusted with water to a lower content of solids, suitable for application. The aqueous dispersions obtained according to the invention can e.g. have a solids content in the range from 25 to 55 wt. % relative to the finished dispersion. For application, they can optionally be diluted with water, e.g. to a suitable spray viscosity.

The emulsifiers can be conventional ionic or non-ionic emulsifiers. Use can be made e.g. of reaction products of alkyl phenols with alkylene oxides or reaction products of sorbitan fatty acid esters with alkylene oxides, e.g. $C_1$-$C_{12}$-alkyl phenol ethoxylates.

Solvent-based coating agents preferably have a binder content of up to 70 wt. % particularly preferably up to 60 wt. %. The lower limit is preferably above 30 wt. %, in each case relative to the finished coating agent.

The coating agents according to the invention can be made from the individual components by conventional methods familiar to the skilled man. To obtain the coating agents, the cross-linking or binder components used according to the invention can optionally be mixed with conventional lacquer additives, e.g. anti-cratering agents, anti-foam agents, levelling agents, anti-precipitation agents, viscosity adjusters, UV-stabilisers or primers. The application and film-forming properties can be influenced via the quantity of additives.

Optionally also, known pigments and/or fillers can be incorporated in the coating agent. The methods, e.g. dispersion or grinding, have frequently been described in the literature. The pigments can be the conventional pigments for clear or covering lacquers, e.g. carbon black, titanium dioxide, finely-dispersed silicon dioxide, aluminium silicate, talc, organic or inorganic colour pigments, transparent dyes, metal-effect pigments or cross-linked polymer micro-particles. Metal-effect covering lacquers, coloured covering lacquers or clear lacquers can be manufactured, depending on the choice of pigments.

The coating agents according to the invention can contain non-reactive solvents. These are for adjusting the viscosity during application or for influencing the process or obtaining specific lacquer effects. The solvents can e.g. be aromatic hydrocarbons, e.g. xylene, or aliphatic hydrocarbons, e.g. n-hexane or cyclohexane, or ketones, e.g. acetone, methyl isopropyl ketone, or esters, e.g. butyl acetate or ethyl acetate, or ethers, e.g. methoxy propanol or butoxy propanol or alcohols, e.g. isopropanol, hexanol or ethyl glycol. The application and levelling properties can be influenced via the boiling point or the varying solubility of the solvent. The amount of solvent added therefore depends on the desired properties, more particularly the viscosity, of the coating agent. The use of water as a solvent results in true solutions, emulsions or dispersions. Water-containing coating agents have a particularly low content of volatile organic constituents.

The coating agents according to the invention are single-component systems. They have high stability in storage and can be stored for more than six months without substantial change in viscosity. The substrates can be metal or plastics or precoated.

The coating agents according to the invention can have an aqueous or non-aqueous structure. In the case of aqueous systems, the additives can optionally be incorporated in the aqueous dispersion of component A or of component B. These components can optionally be mixed before the coating agent is applied. Preferably however it is also possible to produce aqueous single-component systems.

The coating agents according to the invention are applied by known methods such as spraying, dipping, rolling or doctor blade. The covering lacquer coating is applied to the substrate, which optionally may already have other varnish coatings. After a ventilation phase, the applied coating agent is cross-linked by heating. The stoving temperatures are between 100° and 180° C., preferably between 110° and 150° C. The layer thickness of the stoved film is about 15–50 μm. The result is a cross-linked, hard, glossy and acid-resistant varnish coating. A preferred embodiment is use of the coating agent according to the invention as a clear lacquer coating on a base lacquer, preferably an aqueous base lacquer. The wet-in-wet process can be used, or the base lacquer can first be dried by heating. Particularly good adhesion is produced between the two layers.

Coating agents formulated as clear lacquers according to the invention can be applied e.g. over base lacquers containing conventional covering lacquer pigments, preferably decorative pigments such as metallic pigments. The binder bases of the base lacquer can preferably comprise polyester or polyurethane or acrylate resins. These binders can optionally be cross-linked by cross-linking agents, e.g. melamine or isocyanate derivatives.

Examples of base lacquers which can be coated with clear lacquer according to the invention can be found in DE-A-36 28 124, 37 15 254, 37 22 005, 39 13 001 and 40 11 633.

The coating agents according to the invention are particularly suitable for covering lacquers or clear lacquers, preferably for use in the car sector but also in other sectors. The use of the coating agent according to the invention for multi-layer lacquering is particularly suitable for series lacquering of cars, but can also be used for other purposes, e.g. for domestic appliances or in the furniture industry, to obtain special acid-resistant coatings.

In the preceding description, reference has been made to compounds suitable for Michael addition. Without limiting ourselves to a theory, however, it may be assumed that Michael addition is only part of the process according to the invention, and there are other unexplained cross-linking mechanisms.

Example 1

An activator was prepared as per EP-A-0 310 011, Example A10. To this end, 2090.1 g of methane tricarboxylic acid triethyl ester, 709.7 g of butanediol-1,4 and 450.0 g of a polycaprolactone diol with a molecular weight of 400 g/mol were mixed and heated under nitrogen to 125° to 135° C. for 7 hours. A total of 697.5 g of ethanol were distilled off. The residue was 2552.3 g of a colourless viscous liquid having an equivalent weight of 300 g/mol and a weight average molecular weight ($\overline{M}w$; polystyrene standard) of 8300 g/mol.

The substance was diluted with butyl acetate to obtain a solution having a solids content of 60%. C=C equivalent weight: 500 g/mol.

Example 2

A binder was prepared as per EP-A-0 310 011, Example B. To this end, 1000 parts of a glycidyl group-containing acrylate resin manufactured from styrene, glycidyl methacrylate and dimethyl maleinate (epoxy equivalent weight 510) were dissolved in 680 parts of xylene at 70° C., followed by addition of 127 parts of acrylic acid and 1 part of tetraethylammonium bromide. The mixture was then agitated in a stream of air at 80° C. until the acid number was less than unity.

After distilling off 110 g of xylene in vacuo, 560 g butyl acetate was added. The resin solution had a solids content of 50%, C=C equivalent weight: 1280 g/mol.

Example 3

A clear lacquer coating agent was formulated by mixing the following constituents:

| Parts by weight | |
|---|---|
| 55 | parts of resin solution as per Example 2 |
| 23.6 | parts of resin solution as per Example 1 |
| 1 | part of terpene hydrocarbon (pine oil) |
| 14.4 | parts of a mixture of aromatic hydrocarbons (Solvesso 150 and Solvesso 100 in the ratio 28:72) |
| 3 | parts butanol |
| 1.6 | parts of a mixture of commercial anti-light agents (Tinuvin 292 and Tinuvin 1130 in the ratio 1:1). |
| 1 | part of 1% xylene solution of a phenyl methyl silicone (silicone oil AR 200) and |
| 0.4 | parts of water-soluble silicone (Worlee |

| Parts by weight |
| --- |
| additive 315). |

A lacquer structure was then produced as follows: a metal sheet primed with KTL (20 μm) and pre-coated with a commercial filler (35 μm) was coated with conventional water-based lacquer (a dry layer thickness of 15 μm) and pre-dried at 60° C. in a circulating-air oven for 5 minutes. The aforementioned clear lacquer was then adjusted with 1:1 xylene/Solvesso 150 to a spray viscosity of 30 sec (DIN beaker 4, 20° C.) and applied in a dry layer thickness of 35 μm. After ventilation at room temperature for 7 minutes, the base lacquer and the clear lacquer were stored together at 130° C. (object temperature) for 20 minutes.

The result was a hard glossy surface. The clear lacquer had good adhesion and gave a satisfactory result in the acid test.

Test 1: 40% sulphuric acid, 15 minutes at 60° C. (object temperature): satisfactory *

Test 2: 10% sulphuric acid, 10 minutes at 70° C. (object temperature): satisfactory *

*=no optical change

Test 1 did not reveal any dulling of the surface after 30 minutes.

Example 3 was repeated except that 3 wt. % of a 20% solution of triphenyl phosphine in butyl acetate (a prior-art catalyst) was added to the clear lacquer coating agent. It was stoved at 80° for 45 minutes, giving a smooth surface. The test with 40% sulphuric acid at 60° C. (object temperature) was satisfactory after 13 minutes. After 21 minutes the surface became dull.

Example 4

The activator in Example 1 was distilled off in vacuo (<250 mbar) until the solids content was about 90 wt. %. The binder in Example 2 was distilled off in vacuo (<250 mbar) with agitation until the content of solids was about 90 wt. %.

Component A and component B were mixed while warm in the weight ratio of A:B=35:45. Next, 2.5 wt. % of a commercial emulsifier based on sorbitan fatty acid ester (ICI, G 1350) was added while warm and thoroughly homogenised. 60 parts of this mixture were slowly and vigorously agitated in 40 parts of completely demineralised water (40° C.). After thorough homogenisation, the resulting substance was cooled with agitation. The resulting dispersion had a solids content of about 50 wt. %.

The binder dispersion, adjusted with water to a solids content of 40 wt. %, was applied with a doctor blade to a metal sheet pre-coated with KTL, filler and water-based lacquer as in Example 3. The dry layer thickness was 30 μm. After ventilation at room temperature for 10 minutes, the coated substrate was stoved at 150° C. for 20 minutes.

The result was a hard glossy surface. The clear lacquer adhered firmly to the substrate and gave a good result in the acid test.

An independent test was made as before, except that the water used was adjusted to a spray viscosity of 30 sec (DIN beaker 4, 20° C.). The resulting solution was applied by spraying. The dry layer thickness was 30 μm as before. After ventilation at room temperature for 5 minutes, the lacquer was stoved at 150° C. for 20 minutes.

The result as before was a hard glossy surface firmly adhering to the substrate and giving a good result in the acid test.

What is claimed is:

1. A coating composition based on a compound suitable for Michael addition and cross-linking agents wherein the composition is formulated as a single-component coating agent and is free from cross-linking catalysts, wherein the composition is formed from:

(A) one or more compounds acting as cross-linking agents with on average at least two hydrogen atoms originating from one or more of the following groupings which can be the same or different:

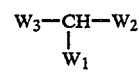

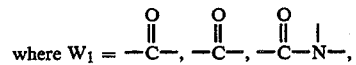

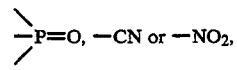

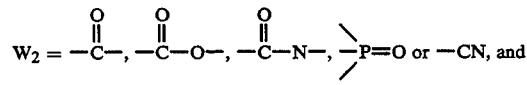

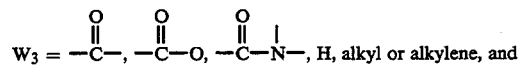

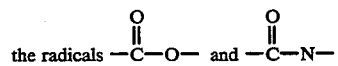

are each bonded via the carbon atom to the CH group, and the CH group is bonded via at least one of the radicals $W_1$, $W_2$, $W_3$ to a polymeric or oligomeric unit; and (B) one or more compositions selected from the group consisting of resins and polyurethane resins suitable for Michael addition, comprising α, β-unsaturated groups bonded via the carbonyl carbon atom of

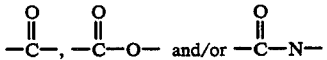

with a C=C eqivalent weight of 85–1800 and a weight average molecular weight of 170–50000, the equivalent ratio of A to B being 2:1 to 1:2; and solvents, conventional lacier additives, optionally water, optionally pigments and optionally fillers.

2. A catalyst-free single-component coating composition according to claim 1, in which the cross-linking component A and the component B are substantially free from primary, secondary and tertiary amino groups.

3. A catalyst-free single-component coating composition according to claims 1 or 2 and in aqueous form with a solvent content of 0 to 15 wt. %, relative to the total coating composition.

4. A catalyst-free single-component coating composition according to claims 1 or 2, containing water and one or more emulsifiers.

* * * * *

UNITED STATES PATENT AND TRADEMARK OFFICE
CERTIFICATE OF CORRECTION

PATENT NO. : 5,416,136

DATED : May 16, 1995

INVENTOR(S) : H. Konzmann, et al.

It is certified that error appears in the above-indentified patent and that said Letters Patent is hereby corrected as shown below:

Column 6, Line 37, "$_nR_4$" should be --$_nR^2$--;

Column 6, Line 47, after $R^2(OH)_n(K=\overset{\overset{O}{\|}}{C}-O)$, insert --or--;

Column 8, Lines 18 and 34, "$R_2$" should be --$R^2$--;

Column 10, Line 31, "$R_4$" should be --$R^4$--;

Column 11, Line 20, "carbony" should be --carbonyl--;

Column 16, Line 22, Claim 1,

"where $W_1 = -\overset{\overset{O}{\|}}{C}-, -\overset{\overset{O}{\|}}{C}-, -\overset{\overset{O}{\|}}{C}-\overset{|}{N}-,$" should be --where $W_1 = -\overset{\overset{O}{\|}}{C}-, -\overset{\overset{O}{\|}}{C}-O-, -\overset{\overset{O}{\|}}{C}-\overset{|}{N}-,$ --;

Column 16, Line 34, Claim 1,

"$W_3 = -\overset{\overset{O}{\|}}{C}-, -\overset{\overset{O}{\|}}{C}-O, -\overset{\overset{O}{\|}}{C}-\overset{|}{N}-,$ H, alkyl or alkylene, and" should be --$W_3 = -\overset{\overset{O}{\|}}{C}-, -\overset{\overset{O}{\|}}{C}-O-, -\overset{\overset{O}{\|}}{C}-\overset{|}{N}-,$ H, alkyl or alkylene, and--; and

UNITED STATES PATENT AND TRADEMARK OFFICE
CERTIFICATE OF CORRECTION

PATENT NO. : 5,416,136
DATED : May 16, 1995
INVENTOR(S) : H. Konzmann, et al.

It is certified that error appears in the above-indentified patent and that said Letters Patent is hereby corrected as shown below:

Column 16, line 54, claim 1, "lacier" should be --lacquer--.

Signed and Sealed this

Twenty-third Day of January, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,416,136
DATED : May 16, 1995
INVENTOR(S) : H. Konzmann et al.

It is certified that error appears in the above-indentified patent and that said Letters Patent is hereby corrected as shown below:

Column 12, Line 23, change "0 5" to -- 0.5 --; and

Column 15, Line 16, change "stored" to -- stoved --.

Signed and Sealed this

Twenty-seventh Day of May, 1997

Attest:

BRUCE LEHMAN

Attesting Officer

Commissioner of Patents and Trademarks